May 8, 1945.　　　　C. A. MAXWELL　　　　2,375,235
APPARATUS FOR TUBE EXPANDING
Filed May 15, 1941　　　5 Sheets-Sheet 1

INVENTOR.
Carl A. Maxwell
BY
N. M. Holbrook　ATTORNEY.

May 8, 1945.  C. A. MAXWELL  2,375,235
APPARATUS FOR TUBE EXPANDING
Filed May 15, 1941  5 Sheets-Sheet 3

INVENTOR.
Carl A. Maxwell
BY
Attorney

May 8, 1945.  C. A. MAXWELL  2,375,235
APPARATUS FOR TUBE EXPANDING
Filed May 15, 1941  5 Sheets-Sheet 4

INVENTOR.
Carl A. Maxwell
BY
Attorney

Patented May 8, 1945

2,375,235

UNITED STATES PATENT OFFICE 2,375,235

APPARATUS FOR TUBE EXPANDING

Carl A. Maxwell, Akron, Ohio, assignor to The Babcock & Wilcox Company, Newark, N. J., a corporation of New Jersey Application May 15, 1941, Serial No. 393,505

10 Claims. (Cl. 80—12)

The subject matter of this invention is the expanding of tubular members and, in a more specific sense, the expanding of metallic tubes against the walls of tube seats in which the tubes are fitted.

In the manufacture of fluid heat exchange apparatus such as steam generators, metallic tubes are fixed in headers, drums, or tube sheets by first positioning the tubes within closely fitting openings and then expanding the tubes tightly against the walls of those openings, and, with the advent of increasing pressures (an increase from 200 pounds per square inch to 2,500 pounds per square inch within a period of thirty years) and the use of furnaces operating at higher and higher temperatures an increasing number of problems have been encountered in such expanding operations. For example, with pressures increasing toward and beyond 2,000 pounds per square inch, the walls of headers and drums have correspondingly increased in thickness, and the same is true of the walls of the tubes.

Steels of improved quality and increased strength have also come into use and, when tubes are to be expanded into tube seats in a five-inch wall of a drum of such improved steel, excessive resistance to the expanding operation has been encountered and greatly increased expanding forces have been necessary.

The expanders of the prior art have operated to expand the tube over the entire length of the tube seat, and as the tube seats have increased in length it has been necessary, with such prior art expanders to take excessively long periods of time to expand even a single tube within a tube seat. There are instances where it has taken a plurality of expander operators more than an hour to expand a single tube, under such conditions, and furthermore, this expanding, in such instances has involved large expanding forces and increased power.

Furthermore, as tube seats have increased in length and as tube wall thicknesses have increased, there have been greater metal flows consequent upon the expanding operations. Such excessive flows of metal have been particularly damaging in the expanding of tubes in steam generators involving a bank of tubes directly connecting and fixed to the same drums or headers. For example, let us consider the expanding of the tubes of a water tube steam boiler in an upper drum and the lower drum at the opposite ends of a large number of tubes which are to be subjected to a pressure of 1,000 pounds per square inch and to furnace gas temperatures ranging from 1,000 degrees F. to 3,000 degrees F. Necessarily, the tubes to stand such pressures must be of increased thickness and the manner of securement of the tubes to the drums must be such as to enable the connections to withstand not only high pressure but also the stresses set up by the variations in gas temperatures to which the tubes and the connections are subjected. Let us assume that the upper and lower headers are set in position and that the tubes are fitted in the drum tube seats by sliding them therein. The next step in the procedure is to expand the tubes to form pressure tight connections between the tubes and drums. The prior practice has been to proceed with the expanding operation from an end of a tube toward its mid portion. Now, if this practice is followed and a pressure tight connection is made by such an expanding operation some of the tube metal will be caused to flow toward the other drum, this action resulting in an increase of the length of the tube. As to the lengthening of the tube, this metal flow is not particularly damaging on the first tube because that tube can slide in the tube seat of the other drum, but when an attempt is made to use this prior art procedure to expand the other end of the same tube in the other drum, there cannot be the same relatively free movement of the tube to take care of the metal flow. However, the position of the drum may be modified to take care of such action. After this is done, however, the positions of the two drums are fixed. Thereafter, when the same procedure is attempted in the expanding of the successive tubes into the drums, a drum cannot be moved to take care of such metal flow and tube lengthening because the securement of the first tube has set the drum spacing, and consequently the remaining tube metal will be put under objectionable stresses. These may even be so great as to result in bending of the tubes.

Attempts have been made to eliminate these objectionable results of prior procedures by counter-boring the drum tube seats. This has the effect of decreasing the length of the tube seats and correspondingly decreasing the metal flows resulting from the tube expanding operation. However, this practice of counter-boring tube seats is objectionable because it reduces the strength of the drums in two ways. First of all, by the removal of metal in the immediate vicinity of the tube, and, secondly, by a consequent decrease in ligament strength.

Among the objects of this invention is the elimination of such difficulties as those above mentioned, the reduction of power and time required to expand tubes within tube seats, and the formation of improved tube seat connections.

The present invention eliminates many of the above indicated difficulties by a procedure which involves, as its initial step, the expanding of that portion of a tube remote from the end of the tube and against that part of the tube seat metal which is adjacent to the wall of the drum or tube sheet remote from the end of the tube. This initial expanding step is accomplished in such a way that an optimum of tube metal flow is attained with a minimum of power consumption, and in a greatly decreased period of time. This is accomplished by having the roller expander element which does the preponderance of the expanding, of a small length relative to the length of the tube seats, other rollers of the expander acting mainly to guide the expander apparatus and to stabilize it within the tube. After this initial expanding operation, the active expander element is moved to a new and successive circular zone location toward the end of the tube from the first location and the expanding is continued. In this way, the flow of metal caused by the expanding operation is toward the end of the tube, and consequently there can be no tendency to put the tubes of a bank of tubes under excessive compressive stresses.

In general, when tubes are expanded in a tube sheet or into the walls of drums or headers, and are subjected to high fluid pressures, the tube and wall connections must be such as to resist great forces tending to move a tube longitudinally with reference to the tube seat and to disrupt the connections. Additionally, there are forces exerted longitudinally of the tubes and through them to the tube seats, resulting from strains induced by temperature changes. There are also torsional forces which may tend to disrupt the tube seat connection. These may result from various internal conditions such as temperature changes, or they may result from loading. These torsional stresses may be considered as exerted tangentially with reference to a tube so that they have a tendency to rotate the tube in the tube seat and thereby destroy the fluid tight connection.

The length of a tube seat, measured axially of a tube, is a major factor in determining the frictional resistance between a tube wall and a tube seat wall, and, this resistance, in a completed joint should nullify forces tending to longitudinally displace the tube with reference to the tube seat. The longer the tube seat, the greater the resistance, provided, of course, that the tube is expanded throughout the entire length of the tube seat. Additionally, it has been proposed that this pull-out resistance of a tube in a tube seat be increased by the milling of grooves in the seat, the tube metal being displaced into these grooves by the expanding operation. With this practice, some of the tube metal would be subjected to shearing stresses in resisting the forces which during the operation of the apparatus, tend to pull the tube out of the tube seat.

The torsional resistance to forces tending to pull a tube out of a tube seat is also a function of the circumferential area of contact between the tube and the seat and this type of resistance is greater in a long tube seat than it is in a short one. Long tube seats therefore have the advantage of a greater resistance to pull-out forces as well as the advantage of increased torsional resistance.

The suggested practice of grooving tube seats would not have the desired effect of increasing the resistance to torsional forces tending to disrupt the tube seat. Furthermore, the machining the grooves of tube seats would involve considerable expense.

In expanding a tube within a tube seat, there is a reduction in the thickness of the wall of the tube, this reduction of thickness resulting from metal flow tending to elongate the tube. The longer the tube seat the greater such metal flow and the greater the tendency to elongate the tube. Consequently, when a plurality of tubes are to be expanded between fixed headers or drums, the expanding operations may set up objectionable compression stresses in the tubes and the drums. Among other things, this invention is intended to eliminate this undesirable tendency, while still presenting the advantages of the longer tube seats.

High pressure drums are expansive because of the thickness of the metal utilized in their fabrication, and because of the weight of the drums, and therefore, it is important, that, in the use of such drums, there be effective utilization of the maximum permissible ligament strength, to reduce drum wall thickness and thereby reduce drum cost.

In distinction to some of the prior art practices, such as those involving the utilization of counter-bored tube seats for high pressure boilers, the tube seats of the present invention, of the outside diameter of the tube, are carried completely throughout the drum metal and are more effective in the providing of adequate ligaments. A grooved tube seat has a length which is but a fraction of the total drum thickness, and when provided with a counter-bored opening extending initially from the tube seat and of a length sufficient to permit axial movement of the tube results in a flow of metal, during the expanding operation, into the portion of the tube externally of the seat, but this flow of metal would be reduced because of the limited length of the tube seat and it was thought that such metal flow would not be objectionable. However, the pull-out strength of such tube seat connections and their resistance to forces tending to develop torsional displacements have been proven to be inadequate.

The present invention provides such tube seats that there may be maximum ligament strengths. The illustrative tube seats can also be machined at much lower cost, but these advantages, along with the advantages of increased pull-out and torsional resistance can be utilized only when the method of expanding is such that the tube metal flow resulting from the expanding will not induce excessive stresses in the tube and drum assembly. Such objectionable stresses are avoided by a practice in which the flow of metal during the expanding operation is toward the end of the tube rather than toward the middle of the tube.

Fundamentally, the invention involved in this application is an improvement over the subject matter of my co-pending application Serial No. 274,749, filed on May 20, 1939, now Patent No. 2,275,451, dated March 10, 1942. The expander illustrated in that application is not, however, adapted for expanding tubes of great wall thickness such as those required for installations of operating at high pressures where the tube wall thickness may be in excess of $\frac{7}{16}''$, and the length of the tube seats greater than three inches. Tube seats of such characteristics result in expanding operations which involve forces of high magniture to cause the necessary metal flow.

In accomplishing the above indicated results the present invention includes within its purview an expander apparatus in which stabilizing rolls are so arranged with respect to the remainder of the expander apparatus that they automatically cause the active portions of the expander rolls to continuously move through the tube and toward the end of the tube.

In general, the present invention may be considered as an apparatus for expanding a heavy wall tube into a tube seat, and more particularly, into tube seats which are of lengths greater than the diameter of the tubes to be inserted therewith, by slower expanding, and working of the metal from the tube seat end remote from the tube end, toward the end of the tube, the illustrated apparatus being such that it is self-advancing.

The various features of novelty which characterize my invention, in compliance with the Federal statutes relating thereto, are pointed out with particularity in the claims annexed to and forming a part of this specification, but, for a better understanding of the invention and the advantages possessed by it, reference should be had to the accompanying drawings and descriptive matter in which I have illustrated or described preferred embodiments of my invention. Other objects of the invention will also appear as the following description proceeds.

In the drawings:

Fig. 14 is an end elevation of the expander cage illustrated in Fig. 13.

Fig. 15 is a partial elevation of the Fig. 13 expander cage particularly indicating the off-set angular relationship of the axis of the cage and the axis of one of the stabilizing rolls. The position from which this elevation is taken may be considered as indicated by the arrow 15a.

Fig. 16 is a partial longitudinal section of the Fig. 13 expander cage taken on the section line 16—16 of Fig. 14.

The expander illustrated in Figs. 1-4 inclusive and 13-16 inclusive of the drawings may be considered as a retractive roller expander in which the expander rolls and the mandrel are eccentric to the roller cage and to the tube to be expanded. The expander barrel or cage 10 is a steel body formed somewhat as a cylinder with such an external diameter that it will be readily received within a tube to be expanded into a tube seat in the wall 14. The cage is formed with an eccentric bore to receive a mandrel 16.

The mandrel is formed with a tapered 18, the surface of which causes the expanding roll 20 and the positioning and feeding rolls 22 and 24 to move outwardly of the expander cage when the mandrel is moved to the right (Fig. 1) with reference to the cage and the tube seat wall 14.

Figures 1, 2:
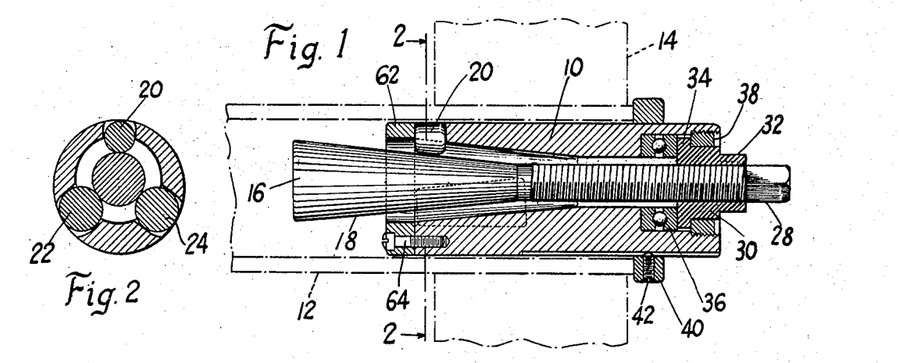
Fig. 1 is a transverse section through a tube and tube seat assembly, and the illustrative roller expander for developing a pressure tight joint between the tube and the wall in which the tube seat is formed.
Fig. 2 is a transverse section of the Fig. 1 expander, on the line 2—2 of Fig. 1.
Figure 3:
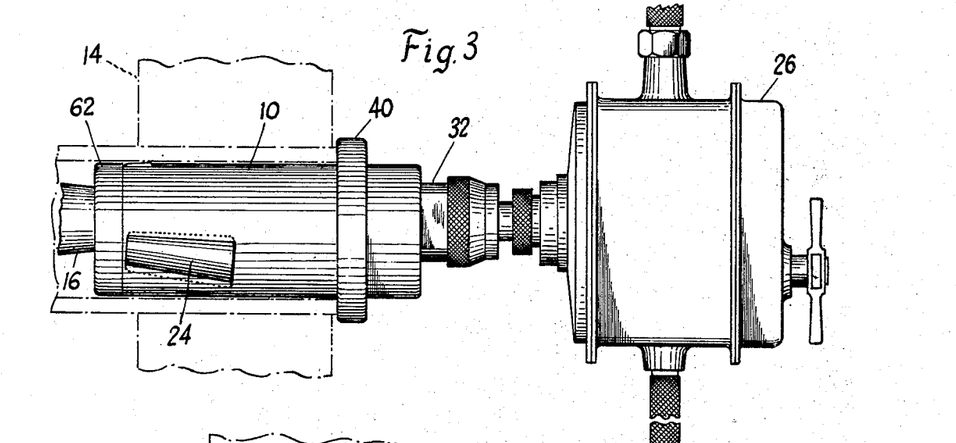
Fig. 3 is an assembly view showing mechanism for operating the illustrative roller expander which is shown in elevation.
Figure 4:
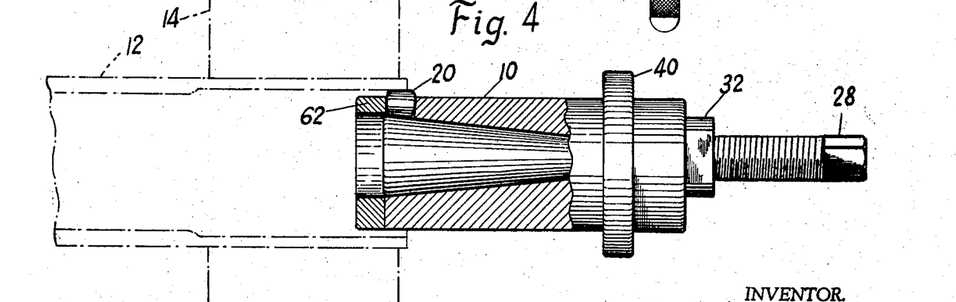
Fig. 4 is a combined longitudinal section and side elevation illustrating the last step in the expanding method in which the Fig. 1 expander may be employed.

The advancement of the mandrel to tube expanding position, after the expander is inserted within the tube as indicated in Fig. 1, is caused by rotation to the mandrel. In practice, the mandrel is rotated by a motor 26 which is readily detachably connected to the squared end 28 of the mandrel. During this rotation and during the initial stages of the tube expanding operation, longitudinal advance of the mandrel is effected by reason of the inter-engagement of the screw threaded part of the mandrel with an internally screw threaded sleeve 30 formed with a coupling extension 32, the latter being initially held stationary by a wrench or spanner.

The sleeve 30 is formed with a radial flange 34, one face of which contacts the thrust bearing 36 disposed at the bottom of a recess in the end of the cage 10; the sleeve 30 being confined between the bearing 36 and the locking ring 38 screw threaded into the cage 10, as shown.

The distance to which the Fig. 1 expander extends into the tube 12 is determined by the adjustment of a stop sleeve 40 along the cage 10. This sleeve is locked in a predetermined position by the set screw 42.

When the sleeve 30 is thus held stationary the rotation of the mandrel causes it to move to the right so as to force the expanding roll 20 and the stabilizing rolls 22 and 24 against the internal surface of the tube 12.

When the frictional resistance resulting from the contact of the tube and roller surfaces reaches a certain degree, the rolls 20, 22 and 24 begin to rotate on their own axes as planet gears and, consequently, the cage 10, operating somewhat in the nature of an orbit gear, is also rotated, but at a different rate. As this operation continues the expanding roller 20, guided and stabilized within the tube by the rolls 22 and 24 exerts increasing pressure radially outwardly on the inner wall of the tube 12 and causes the tube metal to flow axially of the tube, and toward the right hand end of the tube (Fig. 1). At the same time, due to the differential taper of the rollers and the mandrel, and due to the 2 degree angular relationship (lead angle) of the mandrel center line to the center lines of the positioning and feeding rollers 22 and 24 (see Fig. 15) the rollers begin to advance the entire expander toward the right of the position in which it is indicated in Fig. 1. These relationships are such that the tendency of their combined action to advance the expander overcomes the tendency of the expanding roll to mount the tapered portion of the mandrel.

After the bite of the expanding roller 20 into the tube metal reaches the desired degree, the spanner is removed from the coupling 32, and the above indicated relationship of forces thereafter produces an automatic advance of the expander out of the tube.

The angularity of the center lines of the positioning and feeding rolls 22 and 24 with respect to the center line AB of the mandrel (Figs. 14 and 15 of the drawings) illustrates one of the factors producing the automatic advance, or self-feeding action of the expander out of the tube. The line CD may be considered as representing the center line of the roller 22 mounted in the retention socket 50 of the cage 10. As indicated, the lines CD and AB are disposed at an angle of 2 degrees.

The retention socket 50 for the roller 22, as well as the sockets 52 and 54 for the rollers 24 and 20, respectively, may be described as formed with walls which are re-entrant at positions such as 55–60 inclusive, adjacent the periphery of the cage 10. This construction prevents the rolls from falling out of their operative positions around the mandrel 16.

The sockets are otherwise shaped within the annular portion of the cage 10 so as to permit the rolls to move freely radially with respect to the cage.

After the rolls 20, 22 and 24 are inserted in the sockets 50, 52 and 54 they are retained therein by a closure ring 62 corresponding in external contour to the left hand end (Figs. 1 and 2) of the cage. This ring is held in its operative position by a stud screw 64 fitting within an internally screw threaded bore 66 in the end wall of the cage.

A comparison of the extent of the surface of the expander roller 20 in contact with the metal of the tube 12 during the actual expanding operation to the sum of surfaces of the positioning and feeding rollers 22 and 24 in similar contact will indicate the ratio of roller surface which is actually expanding the tube. All of the actual expanding is done by the roller 20, and thus there is a very great reduction of momentary flow of tube metal, in comparison with other expanders which use a plurality of rolls each of which accomplishes the same degree of expanding.

In the present instance, the larger rolls, 22 and 24, serve to stabilize the expanding action and cause the automatic advance of the expander out of the tube.

Now referring to the expander indicated in Figs. 5–12 inclusive, there is a cylindrical cage 70 formed at one end with three retention sockets 71–73 for the similarly formed expander rollers 74–76. These sockets are formed with side walls which are converging, or re-entrant at positions 80–85 adjacent the periphery of the cage.

Figure 5:
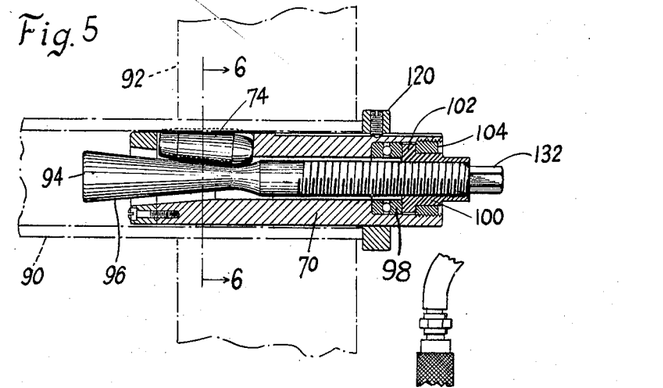
Fig. 5 is a longitudinal section illustrating the structure and mode of operation of another expander which may be employed to effect the illustrative method.
Figure 6:
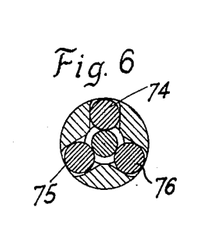
Fig. 6 is a transverse section on the line 6—6 of Fig. 5.
Figure 7:
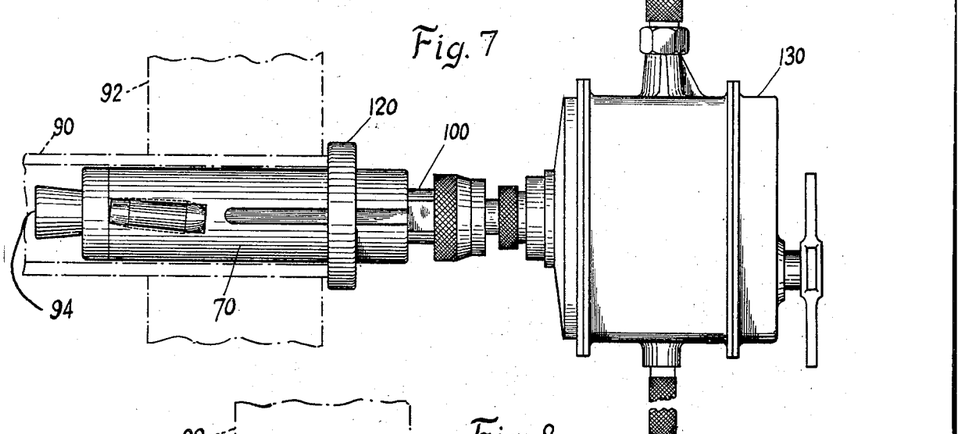
Fig. 7 is an assembly view showing an operating mechanism connected to the expander as the latter is inserted in the tube to be expanded.
Figure 8:
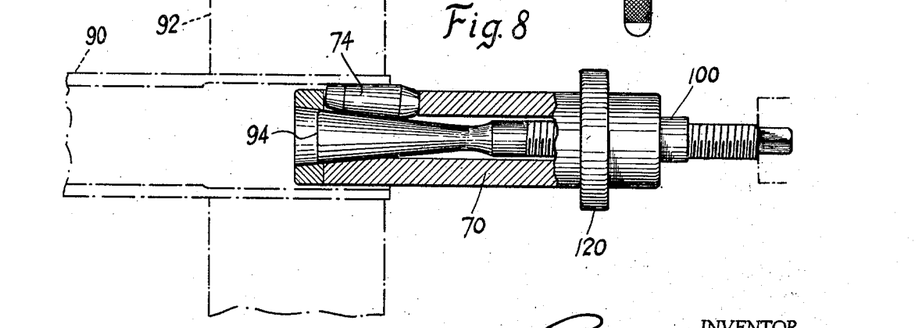
Fig. 8 is mainly a sectional view of the Fig. 5 expander indicating the last step in the expanding of the tube into the tube seat.

The retention sockets 71–73 are also angled with respect to the center line EF (Fig. 10) of the cage and the mandrel that their center lines present the 2 degree angle GKE to the mandrel center line. The expander rollers 74–76 have their center lines in uniform angular relationship to the cage center line EF so that, the roller expanding operation will involve a factor having a tendency to automatically feed or advance the expander from the initial expanding position in which it is shown in Fig. 5, to the right outwardly of the tube 90 and its tube seat in the wall 92. The mandrel 94 is formed with an active expanding section 96 tapered $\tfrac{7}{16}''$ to the inch, a taper so selected that the mandrel surface active in engagement with the expanding rollers will be presented to the rollers at an angle slightly greater than that which will permit the self-feeding action of the rollers 74–76 to surmount the mandrel. In other words, the taper of the mandrel constitutes an angle slightly greater than that which self-feeding action of the rollers will surmount. Thus the thrust of the mandrel, in the main part of the expanding operation will be always toward the front of the mandrel (or its left hand end as indicated in the drawings). This thrust is taken by the bearing 98 from the coupling collar 100 which has an annular flange 102 confined between the bearing 98 and a lock collar 104. All of these elements are disposed within a recess in the right hand end of the cage as shown.

Each of the rollers 74–76 has a central portion 110 which is tapered, the taper of this portion being slightly less than one-half the taper of the mandrel. Beyond this tapered portion 110 each roller has a portion 112, the taper of which is slightly greater than one half the taper of the mandrel. Thus the stabilizing portion of 110 of each of the rollers 74–76 rests against the mandrel and does the initial part of the expanding and the portion 112 of the roller (the surface of which is parallel to the axis EF of the tube) does the final or heavier part of the expanding.

In the operation of the expander shown in Figs. 5–12 the collar 120 is adjusted along the cage 70 so that the distance from the collar to the left hand end of each expander roll is ¼" to ½" greater than the thickness of the wall 92 in which tube 90 is fitted plus the projection of the tube beyond the wall. Then the expander is placed in the tube in the position in which it is shown in Fig. 5 with the collar 120 contacting the end of the tube 90. Then the coupling collar 100 is held stationary with a wrench or spanner and an air motor 130 is employed to rotate the mandrel through easily detachable engagement with the polygonal coupling end 132 until the rollers 74–76 are moved radially outwardly of the cage 70 sufficiently to expand the tube. Then the coupling or nut 100 is released and the turning of the mandrel operates to maintain the expanding pressure and automatically advance the expander toward the adjacent end of the tube.

Considering the expander of Figs. 5–12 to be employed in securing the ends of the tubes of a bank connecting two drums, the purpose of the expander is to roll the tube from the outside of the drum wall toward the inside, thus bringing all axial movement of the tube, due to the expanding operation, toward the inside of the drum. With this manner of expanding, no stresses are set up upon the intermediate portions of the tubes between the drums. Also, the expander rolls the tube with the major part of the metal flow limited to a very small portion of the tube seat at any one time. This tends to produce maximum holding power of the tube with a minimum stress on the tube seat. Also, with the illustrative apparatus employed in the illustrative method much less power is required for operating the expander.

Figure 9:
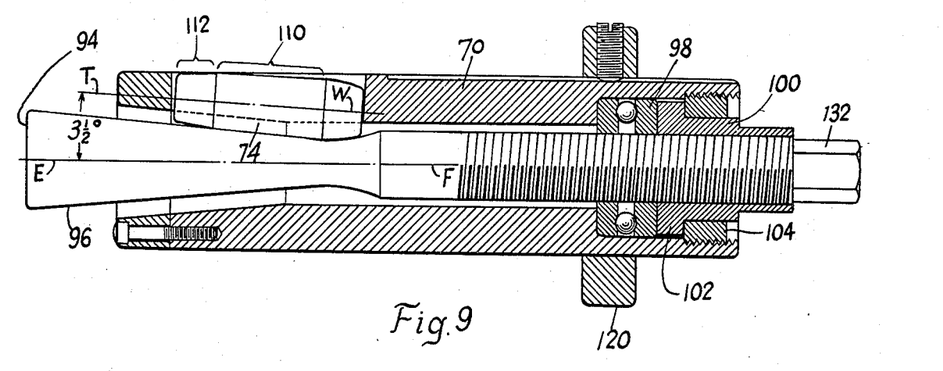
Fig. 9 is an enlarged longitudinal section of the Fig. 5 expander showing the relationship of the elements in detail.
Figure 10:
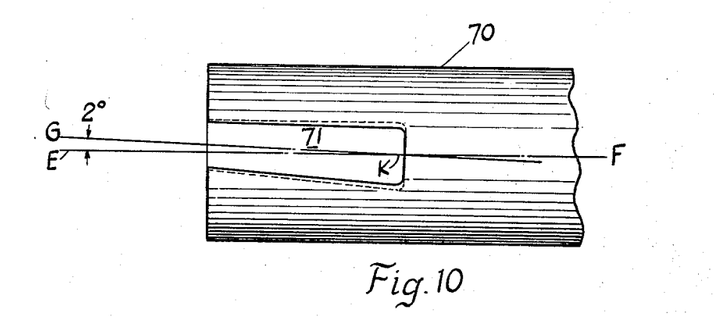
Fig. 10 is a partial plan of the expander cage, illustrating the angular relationship of the center lines of the expander rollers and the center line of the mandrel.
Figure 11:
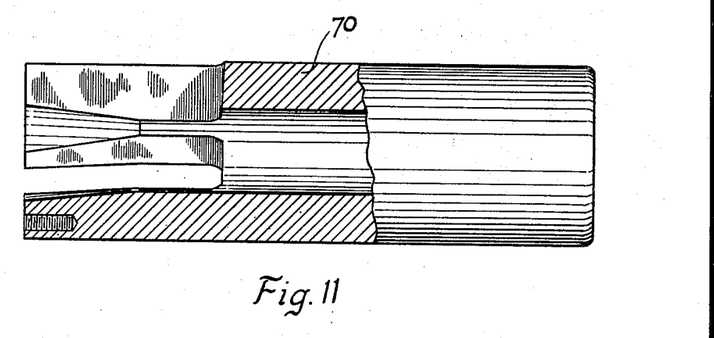
Fig. 11 is a sectional view of the barrel or cage of the Fig. 9 expander showing the conformation and relationships of the expander roll retention sockets in the cage.
Figure 12:
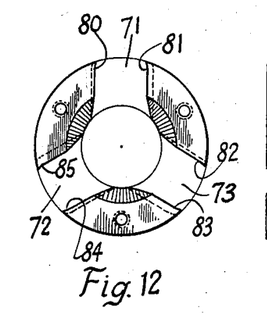
Fig. 12 is an end elevation of the expander barrel or cage shown in Fig. 11.
Figure 13:
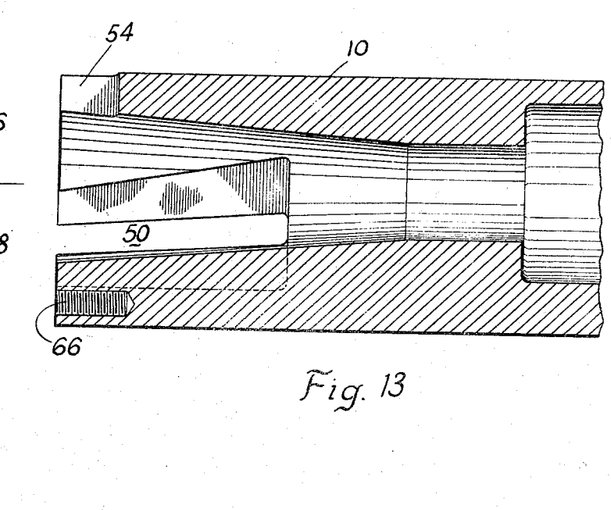
Fig. 13 is a partial longitudinal section of the roller cage of the Fig. 1 expander, illustrating the relationships of the roller retention sockets. This view is taken on the section line 13—13 of Fig. 14.
Figures 14, 15, 16:
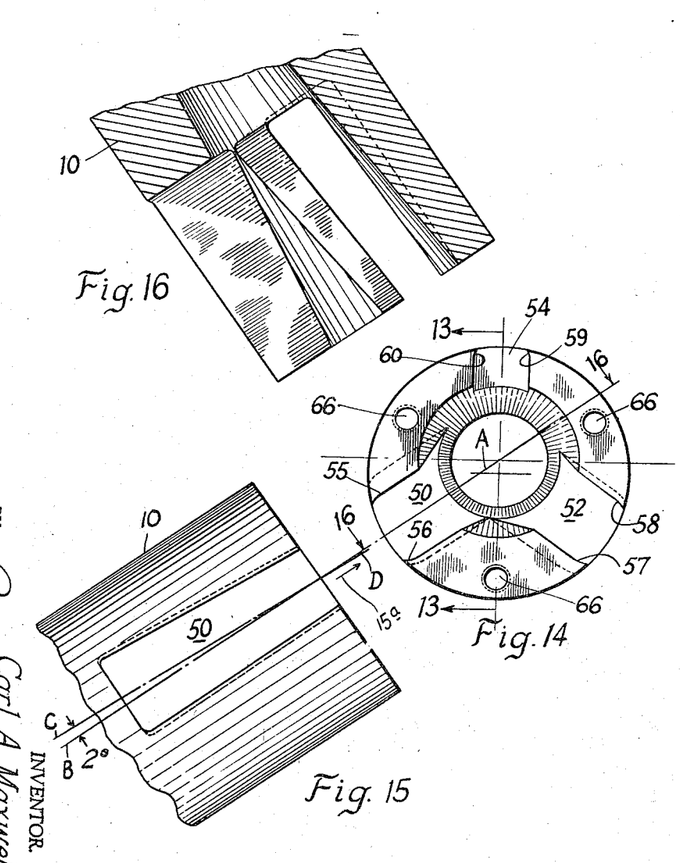

With further reference to Fig. 9 of the drawings, it will be seen that the center line TW of the roll 74 forms an angle of 3½ degrees with the center line EF of the mandrel or the tube. This relationship of parts, together with the relative degrees of taper of the mandrel and roller surfaces indicates one factor in the construction of the illustrative mechanism which tends to cause the action described.

Figure 17:
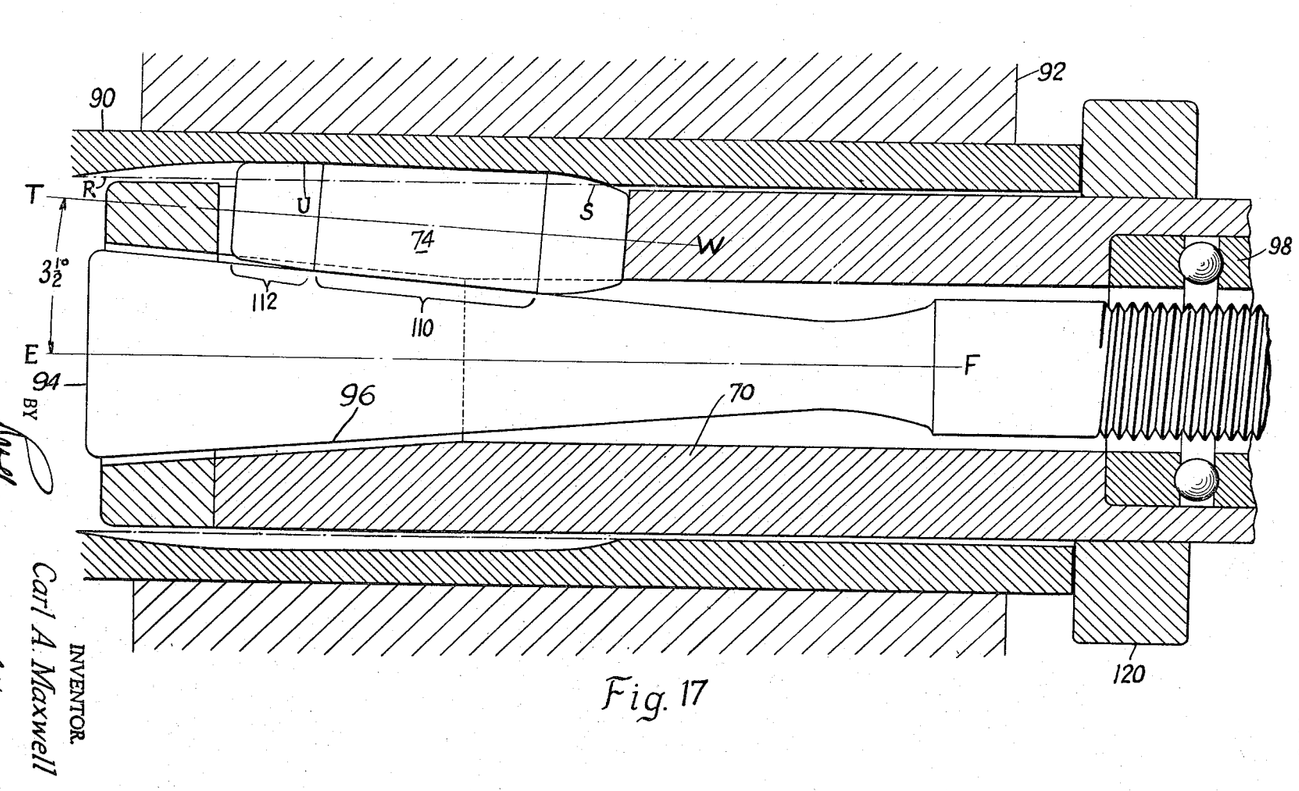
Fig. 17 is a longitudinal section showing the operation of the Fig. 5 expander during an early stage of the expanding operation.

Fig. 17 illustrates an early stage of the expanding operations, the straight line RS when compared to the curved line RUS indicating the extent of deformation of the tube in the expanding operation. The straight line RS is intended to indicate the interior surface of the tube before expansion, and the curved line RUS, the surface of the tube after expansion. An inspection of this figure will show that the portion 112 of the roller 74 has its active surface at a greater distance from the line RS than the stabilizing portion 110, or the remainder of the roller.

Whereas, in order to comply with Sec. 4888 R. S., and other Federal statutes pertaining thereto, the invention has been described with reference to the details of selected embodiments it is not intended that the invention shall be limited to all of those details. It is, rather, to be construed as of a scope corresponding to that indicated by the subjoined claims.

The specific method of tube expanding disclosed herein is not claimed in this application. It is, however, claimed in my co-pending divisional application, Serial No. 519,591, filed January 25, 1944. Also, the expander embodiment illustrated in original Figs. 1, 2, 3, 4, 13, 14, 15, and 16 is not specifically claimed herein, but is claimed in my co-pending divisional application, 519,141, filed January 21, 1944.

What is claimed is:

1. In a retractive roller expander readily slidable into a tube to be expanded, a roller cage, a stop on the cage to limit the movement of the expander into the tube, a tapered mandrel rotatably mounted within the cage with the small end of the taper disposed between the stop and the large end of the taper, multiple diametered roller means including roller units circumferentially distributed about the mandrel and rotatable by the mandrel within similarly distributed cage openings, part of said means having its tube metal engaging surface disposed at the maximum radius from the tube axis and accomplishing the final or heavier part of the tube expanding and being of a mean diameter smaller than the maximum operative diameter of at least the remainder of said means, said roller means part also being of a length much less than the remainder of said means, and means effecting relative longitudinal movement of the mandrel and the cage to radially outwardly displace the roller means and expand the tube after the expander has been inserted within the tube to its fullest extent, at least a part of said roller means being angled relative to the mandrel axis to cause the expander to progress outwardly of the tube as the mandrel is rotated.

2. In a retractive roller expander, a roller cage, a stop fixed relative to the cage and operative to engage the end of a tube to be expanded and to limit the movement of the retracted expander into the tube, a mandrel rotatable within the cage, the mandrel having a section disposed at the tube side of said stop and tapering downwardly toward the stop, tube engaging rollers disposed about the mandrel and constructed with an outer or following part of the active roller structure ironing out the tube metal and effecting the final part of the expanded action, and means for effecting relative longitudinal movement between the mandrel and the cage to produce radial displacement of the rollers (to expand the tube) after the expander has been positioned within the tube, at least some of the rollers having their axes disposed at an acute angle to the axes of the mandrel and the tube and in intersecting relation to any plane wholly containing the tube axis or mandrel axis so that the subsequent rotation of the mandrel causes the progressive expansion of the tube and the retractive movement of the expander toward the adjacent tube end.

3. A retractive roller expander comprising, in combination, a roller cage of such a diameter that it is readily insertible in a tube to be expanded, a stop fixed relative to the cage and operative to engage the end of the tube to limit the movement of the retracted expander into the tube, a mandrel rotatable within the cage, the mandrel having a tapered section disposed within the cage at the tube side of said stop and tapering downwardly toward the stop, tube engaging expander rollers disposed about the mandrel in a circumferential arrangement and constructed with the final tube metal working surface engaging the tube toward the large end of the mandrel's tapered section relative to at least the major part of the remainder of the tube engaging surfaces of the rollers, and means for effecting relative longitudinal movement between the mandrel and the cage to cause outward radial displacement of the rollers after the expander has been positioned within the tube to the maximum extent, roller axes being disposed at an acute angle to the axis of the mandrel and in intersecting relation to any plane wholly containing the tube axis or mandrel axis so that the subsequent rotation of the mandrel simultaneously causes the progressive expansion of the tube and the retractive movement of the expander toward the adjacent tube end.

4. In a retractive roller expander readily movable into a tube to be expanded against a tube seat, a roller cage, means forming a stop fixed relative to the cage and adapted to engage a tube end to limit the movement of the contracted expander into the tube and these determine the position at which the tube expanding is to be initiated, a tapered mandrel rotatably mounted within the cage and having the small end of its tapered section intermediate the stop and the large end of the tapered section, a plurality of tapered expander rollers in contact with the tapered portion of the mandrel and disposed within openings in the cage at distributed positions around the cage and the mandrel, the taper and construction of said expander rollers being such that only a small portion of their total surfaces in operative engagement with the tube metal is at the maximum radial distance from the longitudinal axis of the tube, and structure for axially moving the mandrel relative to the cage to effect outward radial displacement of the rollers after the expander has been positioned within the tube to its maximum extent, said roller surface portion at the maximum radial distance from the tube axis doing the final part of the expanding and being disposed adjacent the mandrel section of greater diameter, the axes of said rollers being disposed at an acute angle to the axis of the mandrel and in intersecting relation to any plane wholly containing the tube axis or the mandrel axis so that subsequent rotation of the mandrel simultaneously causes progressive expansion of the tube and the retractive movement of the whole expander toward the adjacent end of the tube.

5. In a retractive roller expander readily slidable into a tube to be expanded, a roller cage, a stop on the cage to limit the movement of the expander into the tube, a tapered mandrel rotatably mounted within the cage with the large end of the mandrel being disposed towards the leading end of the expander and with the small end of the mandrel disposed between the stop and the large end of the mandrel, multiple diametered roller means including roller units circumferentially distributed about the mandrel and rotatable by the mandrel within similarly distributed cage openings, part of said means accomplishing at least the final part of the tube expanding, being of a mean diameter smaller than the maximum diameter of at least the remainder of said means and being disposed at the leading end of the means, the relative tapers of said mandrel and roller means being such that the working surface of said part is disposed at the outer radial extremity of said means, said roller means part also being of a length much less than the remainder of said means, and means effecting relative longitudinal movement of the mandrel and cage to radially outwardly displace the roller means and expand the tube after the expander has been inserted within the tube to its fullest extent, at least part of said roller means being angled relative to the mandrel axis to cause the expander to progress outwardly of the tube as the mandrel is rotated.

6. In a retractive roller expander, a roller cage, a stop fixed relative to the cage and operative to engage the end of a tube to be expanded and to limit the movement of the contracted expander into the tube, a mandrel rotatable within the cage, the mandrel having a tapered section with its smaller end between its larger end and the stop, tapered tube-engaging rollers disposed about the tapered section of the mandrel, the rollers having their larger ends disposed towards the stop and tapering downwardly towards the larger end of the mandrel, the relative tapers of said mandrel and at least one of said rollers being such that its working surface near its smaller end of said one roller is disposed at the maximum outer radial position relative to all active roller surfaces and relative to the axis of the mandrel.

7. A retractive roller expander comprising, in combination, a roller cage of such diameter that it readily insertable in a tube to be expanded, a stop fixed relative to the cage and operative to engage the end of the tube to limit the movement of the retracted expander into the tube, a mandrel rotatable within the cage, the mandrel having a tapered section disposed at the tube side of said stop with its smaller end between its larger end and the stop, tapered tube-engaging expander rollers disposed about the mandrel in a circumferential arrangement, said rollers having their larger ends disposed towards the stop and being tapered downwardly towards the larger end of the mandrel, the relative tapers of said mandrel and said rollers being such that the predominantly effective roller surface engages the tube toward the large end of the mandrel relative to at least the major part of the remainder of the tube-engaging surfaces of the rollers, and means for effecting relative longitudinal movement between the mandrel and the cage to cause outward radial displacement of the rollers after the expander has been positioned within the tube, at least one of the rollers being so angled relative to the mandrel axis as to cause the subsequent rotation of the mandrel to effect the progressive expansion of the tube and the retractive movement of the expander outwardly toward the adjacent tube end.

8. A retractive roller expander comprising, in combination, a roller cage readily insertible in a tube to be expanded, a stop fixed relative to the cage and operative to engage the end of the tube to limit the movement of the retracted expander into the tube, a mandrel, the mandrel having a tapered section disposed within the cage at the cage at the tube side of said stop and tapering with its small end toward the stop, reversely tapered tube engaging expander rollers disposed about the mandrel in a circumferential arrangement and constructed with their final tube metal working surface engaging the tube toward the large end of the mandrel's tapered section relative to at least the major part of the remainder of the tube engaging surfaces of the rollers, and means moving the mandrel longitudinally relative to the cage for effecting outward radial displacement of the rollers after the expander has been positioned within the tube to the maximum extent, said means including a thrust member screw-threaded on the mandrel, the rollers being disposed with their axes at acute angles to the axis of the mandrel and in intersecting relation to any plane wholly containing the tube axis or mandrel axis so that subsequent rotation of the mandrel simultaneously causes the progressive expansion of the tube and the retractive movement of the expander toward the adjacent tube end.

9. A retractive roller expander comprising, in combination, a roller cage readily insertible in a tube to be expanded, a stop fixed relative to the cage and operative to engage the end of the tube to limit the movement of the retracted expander into the tube, a mandrel having a tapered section disposed within the cage at the tube side of said stop and tapering downwardly with its smaller end toward the stop, reversely tapered tube engaging expander rollers disposed about the mandrel in a circumferential arrangement and constructed with their final tube metal working surface engaging the tube toward the large end of the mandrel's tapered section relative to at least the major part of the remainder of the tube engaging surfaces of the rollers, and means for effecting relative longitudinal movement between the mandrel and the cage to cause outward radial displacement of the rollers after the expander has been positioned within the tube to the maximum extent, said means including a thrust member screw-threaded on the mandrel and rotatively mounted within the cage, the rollers being disposed with their axes at an acute angle to the axis of the mandrel and in intersecting relation to any plane wholly containing the tube axis or mandrel axis so that the subsequent rotation of the mandrel simultaneously causes the progressive expansion of the tube and the retractive movement of the expander toward the adjacent tube end.

10. A retractive roller expander comprising, in combination, a roller cage readily insertible in a tube to be expanded, a stop fixed relative to the cage and operative to engage the end of the tube to limit the movement of the retracted expander into the tube, a mandrel having a tapered section disposed with the cage at the tube side of said stop and tapering downwardly with its smaller end toward the stop, reversely tapered tube engaging expander rollers disposed about the mandrel in a circumferential arrangement and constructed with their final tube metal working surface engaging the tube toward the large end of the mandrel's tapered section relative to at least the major part of the remainder of the tube engaging surfaces of the rollers, and means for effecting relative longitudinal movement between the mandrel and the cage to cause outward radial displacement of the rollers after the expander has been positioned within the tube to the maximum extent, said means including an annular thrust member screw-threaded on the mandrel and rotatively mounted within the cage, the rollers being disposed with their axes at an acute angle to the axis of the mandrel and in intersecting relation to any plane wholly containing the tube axis or mandrel axis so that the subsequent rotation of the mandrel simultaneously causes the progressive expansion of the tube and the retractive movement of the expander toward the adjacent tube end, each of said rollers having its final tube working surface presented by a relatively short end section of a steeper taper than the main part of the roller.

CARL A. MAXWELL.

Certificate of Correction

Patent No. 2,375,235.

May 8, 1945.

CARL A. MAXWELL

It is hereby certified that errors appear in the printed specification of the above numbered patent requiring correction as follows: Page 3, second column, line 27, after "tapered" insert *section*; page 4, first column, line 73, after "also" insert *so*; page 5, second column, line 7, claim 2, for "expanded" read *expanding*; and line 55, claim 4, for "these" read *thus*; page 6, first column, line 61, claim 7, after "it" insert *is*; and line 69, same claim, strike out the article "a"; and second column, line 21, claim 8, strike out "at the cage"; and that the said Letters Patent should be read with these corrections therein that the same may conform to the record of the case in the Patent Office.

Signed and sealed this 29th day of October, A. D. 1946.

[SEAL]

LESLIE FRAZER,
*First Assistant Commissioner of Patents.*